US008812668B2

(12) United States Patent
Poluri et al.

(10) Patent No.: US 8,812,668 B2
(45) Date of Patent: Aug. 19, 2014

(54) ENHANCED HUMAN INTERACTIVE PROOF (HIP) FOR ACCESSING ON-LINE RESOURCES

(75) Inventors: Ravi Kiran Reddy Poluri, Sammamish, WA (US); Weisheng Li, Bothell, WA (US); Usman Ahmed Shami, Bellevue, WA (US); Vaishali De, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 12/613,688

(22) Filed: Nov. 6, 2009

(65) Prior Publication Data

US 2011/0113147 A1    May 12, 2011

(51) Int. Cl.
| G06F 15/173 | (2006.01) |
| H04L 29/06 | (2006.01) |
| G06F 21/31 | (2013.01) |
| G06F 21/36 | (2013.01) |

(52) U.S. Cl.
CPC ............... *H04L 63/08* (2013.01); *G06F 21/31* (2013.01); *G06F 21/36* (2013.01); *G06F 2221/2103* (2013.01); *G06F 2221/2133* (2013.01)
USPC .......................................... 709/225; 709/224

(58) Field of Classification Search
CPC ......... H04L 63/08; G06F 21/31; G06F 21/36; G06F 2221/2103; G06F 2221/2133
USPC ................................................ 709/224, 225
See application file for complete search history.

(56) References Cited

U.S. PATENT DOCUMENTS

| 2005/0065802 A1* | 3/2005 | Rui et al. ........................... 705/1 |
| 2005/0070262 A1* | 3/2005 | Weigand ....................... 455/418 |
| 2005/0229251 A1 | 10/2005 | Chellapilla et al. |
| 2005/0246775 A1 | 11/2005 | Chellapilla et al. |
| 2006/0095578 A1 | 5/2006 | Paya et al. |
| 2007/0026372 A1 | 2/2007 | Huelsbergen |
| 2007/0143624 A1 | 6/2007 | Steeves |
| 2007/0234423 A1 | 10/2007 | Goodman et al. |
| 2008/0216163 A1* | 9/2008 | Pratte et al. ......................... 726/7 |
| 2009/0025010 A1* | 1/2009 | Foottit et al. .................. 719/313 |
| 2009/0076965 A1 | 3/2009 | Elson et al. |
| 2009/0077628 A1 | 3/2009 | Elson et al. |
| 2009/0077629 A1 | 3/2009 | Douceur et al. |
| 2009/0150983 A1 | 6/2009 | Saxena et al. |
| 2009/0204819 A1 | 8/2009 | Parker |
| 2010/0229223 A1* | 9/2010 | Shepard et al. ................... 726/5 |

OTHER PUBLICATIONS

Elson et al., Asirra: A CAPTCHA that Exploits Interest-Aligned Manual Image Categorization, 2007, all pages.*

(Continued)

*Primary Examiner* — Hieu Hoang
(74) *Attorney, Agent, or Firm* — Sade Fashokun; Bryan Webster; Micky Minhas (57) ABSTRACT

A method is provided for protecting an on-line resource using a HIP challenge. The method includes receiving a request to access the on-line resource from a remote client. A HIP challenge is presented to a user associated with the remote client. If a successful response to the HIP challenge is received from the user, a previous response pattern of the user is compared to known response patterns of humans and machines. The user is allowed to access to the on-line resource if the comparison indicates that the user is likely a human.

19 Claims, 6 Drawing Sheets

(56) References Cited

OTHER PUBLICATIONS

Rusu, et al., "A Human Interactive Proof Algorithm Using Handwriting Recognition", retrieved at <<http://ieeexplore.ieee.org/stamp/stamp.jsp?arnumber=01575687>>, Proceedings of the 2005 Eight International Conference on Document Analysis and Recognition, 2005, pp. 5.

Kluever, et al., "Balancing Usability and Security in a Video CAPTCHA", retrieved at <<http://cups.cs.cmu.edu/soups/2009/proceedings/a14-kluever.pdf>>, Symposium on Usable Privacy and Security, Jul. 15-17, 2009, pp. 11.

Rui, et al., "ARTiFACIAL: Automated Reverse Turing Test using Facial Features", retrieved at <<http://research.microsoft.com/en-us/um/people/yongrui/ps/mmsj04hip.pdf>>, Aug. 11, 2009, pp. 24.

Basso, Alessandro, "Protecting Web Resources from Massive Automated Access", retrieved at <<http://www.di.unito.it/~basso/papers/captcha-RT114-08.pdf>>, Aug. 11, 2009, pp. 1-57.

Chellapilla, et al., "Using Machine Learning to Break Visual Human Interaction Proofs (HIPs)", retrieved at <<http://research.microsoft.com/en-us/um/people/kumarc/pubs/chellapilla_nips04.pdf>>, Aug. 11, 2009, pp. 8.

\* cited by examiner

ENHANCED HUMAN INTERACTIVE PROOF (HIP) FOR ACCESSING ON-LINE RESOURCES

BACKGROUND

There are many Internet or web based services that have a need to distinguish between a human and a computer user interacting with the service. For example, there are many free e-mails services that allow a user to create an e-mail account by merely entering some basic information. The user is then able to use the e-mail account to send and receive e-mails. This ease of establishing e-mail accounts has allowed spammers to produce computer programs to automatically create e-mail accounts with randomly generated account information and then employ the accounts to send out thousands of spam e-mails. Other Internet or web based services provide users with a convenient means through which to order products such as tickets, access personal account information, or to access other services. These web based systems are not only convenient to vendors as well as to their customers, but they also reduce overall costs.

Web based services have increasingly employed Turing test challenges (commonly known as a Completely Automated Public Turing test to tell Computers and Humans Apart (CAPTCHA™) or Human Interactive Proof (HIP)) in order distinguish between a human and a computer as the user of the web service. The HIP or CAPTCHA, which will be used interchangeably herein, is designed so that a computer program would have difficulty passing the test, but a human can more easily pass the test. The web service will only allow the user to employ the service after the user has passed the HIP.

One common example of an HIP is an image that includes text, which may be an actual word or phrase, or may be a nonsensical combination of letters, digits, and other characters. To solve the HIP challenge, a user types in the characters that are shown. Other types of challenges (e.g., audio and/or video challenges) may also be developed as HIPs, which are all designed to determine whether a particular request received by a web site is being initiated by a human being.

While current character-based HIPs can work very well in many applications, automated systems have become better at circumventing them through improved character recognition and image filtering and processing techniques. For example, in the case of a text-based HIP optical character recognitions (OCR) systems can allow an automated computer program to recognize at a fairly high percentage characters even with the distortions, convolutions, or noise that have been added to a text based challenge. Given this success rate of OCR, an automated system will achieve a pass rate for the HIP challenge that may not be acceptable to the service that is employing the HIP. Similarly for an image-based HIP, machine vision systems can provide fairly accurate classification of images and over many HIP challenges could achieve a substantial success rate. There is a continuing need to counter the success of automated computer programs that attempt to pass HIP challenges.

SUMMARY

As both machines and humans attempt to respond to HIP challenges, the manner in which they fail is often different. As a result, over repeated attempts the pattern of failures may differ, thereby providing distinctive signatures by which the machine can be distinguished from the human. In other words, instead of simply using the failure or success in passing a HIP challenge as the sole criterion to distinguish between a human and a machine, the pattern of responses to HIP challenges may be used as an additional criterion to make this distinction. When an individual user (i.e., an individual human or machine) attempts to access an on-line resource multiple times, the response pattern of that user can be compared to the statistically derived response patterns for humans and machines which have previously been obtained.

In one illustrative example, a system for implementing a HIP challenge includes a human interactive proof (HIP) challenge component that displays a HIP challenge to a user. The system also includes a HIP response evaluator component that determines if the user is a human or non-human based at least in part on a previous response pattern of the user. A storage medium is also provided for storing the previous response pattern of the user.

In another illustrative example, a method is provided for protecting an on-line resource using a HIP challenge. The method includes receiving a request to access the on-line resource from a remote client. A HIP challenge is presented to a user associated with the remote client. If a successful response to the HIP challenge is received from the user, a previous response pattern of the user is compared to known response patterns of humans and machines. The user is allowed to access to the on-line resource if the comparison indicates that the user is likely a human.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
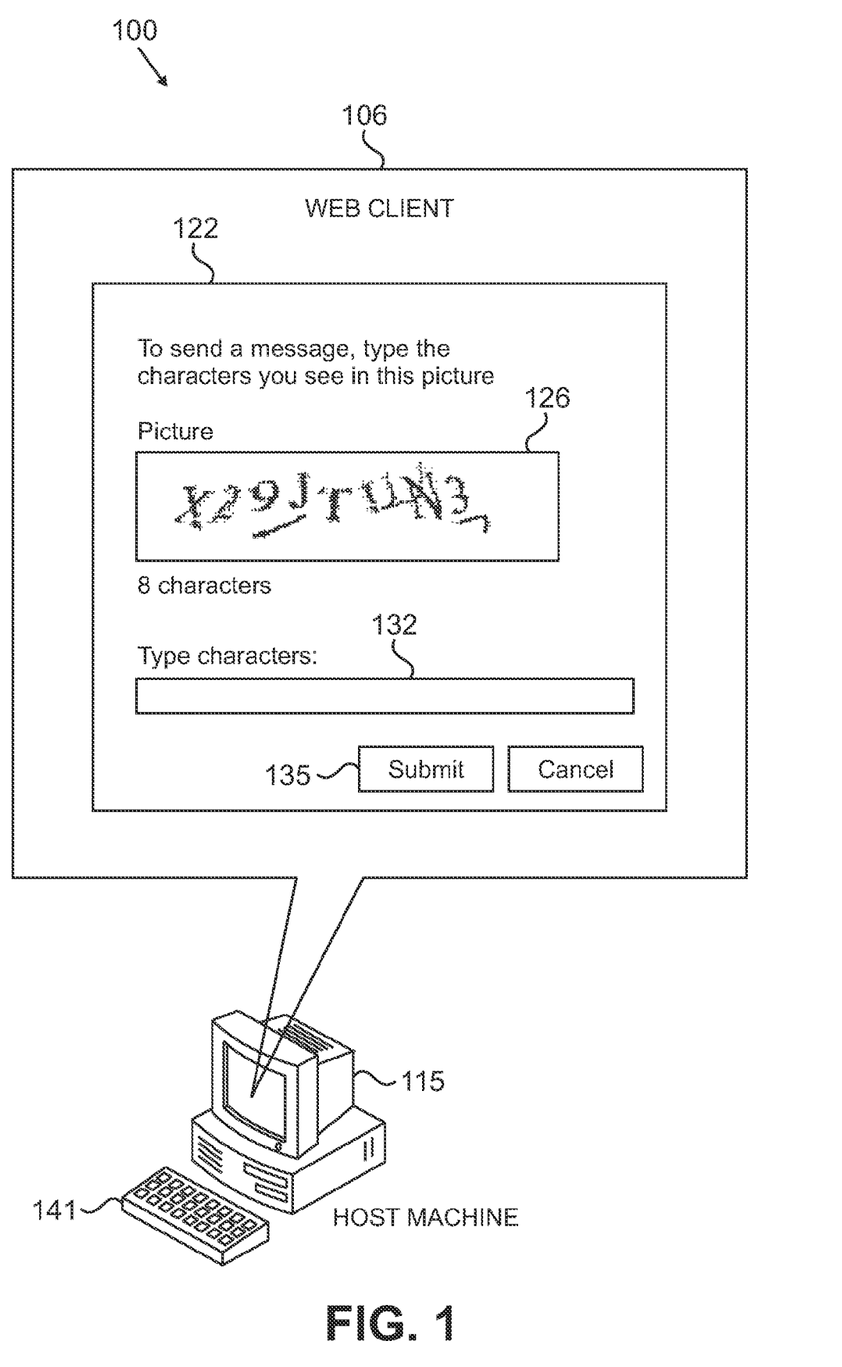
FIG. 1 shows an illustrative computing environment in which a web client on a host machine displays a HIP challenge to a user.

FIG. 1 shows an illustrative computing environment 100 in which a web client 106 running on a host machine 115 displays a HIP challenge 122 to a user. HIPs are also known as "CAPTCHAs" which is an acronym for "Completely Automated Public Turing tests to tell Computers and Humans Apart" coined by Carnegie Mellon University in 2000.

The web client 106 is arranged to enable the user working at the host machine 115 to browse and interact, using an on-line interface, with applications, content, services, and other on-line resources that are commonly provided by remote resource servers over networks such as the Internet. One example of a commercially available web client is the Microsoft Internet Explorer® web browser. In addition to protecting web-based content such as web pages, HIP challenges may also be utilized with Internet-enabled desktop software and applications. For example, messaging services, such as Windows Live™ Messenger, can use HIP challenges to help prevent spam messages from being sent by automated scripts, bots, or other processes.

While the host machine 115 is shown in this example as a desktop PC (personal computer), HIP challenges can be used on web clients that run on other types of devices including, for example, laptop PCs, game consoles, set-top boxes, handheld computers, portable media rendering devices, PDAs (personal digital assistants), mobile phones, and similar devices.

The HIP challenge 122 includes a HIP 126 that is configured, in typical existing computing environments, as a character-based HIP that the remote server provides as an image or picture for display by the web client 106. In this example, the HIP challenge 122 requires the user to recognize the eight characters in the HIP 126 and then type the recognized characters into a text entry box 132. The user clicks the submit button 135 on the HIP challenge 122 so that the user's solution to the challenge can be checked for correctness.

The user's typed characters must correctly match those shown in the HIP 126, and be entered in a matching sequence, before the remote server will grant the user access to a resource, or perform a requested action. For example, HIP challenges are commonly utilized to protect services that may be vulnerable to misuse, such as web-based e-mail services, blogs (i.e., weblogs), rating systems, and forums where spam e-mails and automated postings can be disruptive or cause harm. On-line resources such as libraries and search services also commonly utilize HIP challenges to prevent misuse.

In addition to accessing web-based resources, the computing environment 100 may alternatively be utilized in local networking scenarios. For example, HIP challenges may be used in an enterprise network to secure resources against misuse by automated processes running on remote machines, or even local machines in some cases.

As shown in FIG. 1, the HIP challenge 126 comprises an image containing random arcs and line ("clutter") and jumbled or distorted-appearing characters that is intended to be only decipherable by a human. Character-based HIPs are in common use because characters were designed by humans for humans, and humans have been trained at recognizing characters since childhood. Each character has a corresponding key on the keyboard 141 coupled to the host machine 115 which facilitates convenient entry of the solution to the challenge, and the task of solving a HIP challenge is easily understood by users with minimal instructions. Character-based HIPs can also be generated in an automated manner quickly by a process running on a remote server. However, while being capable of being quickly generated, a character-based HIP with eight characters still represents 100 billion potential solutions which helps prevent a HIP being solved through random guessing.

Figure 2:
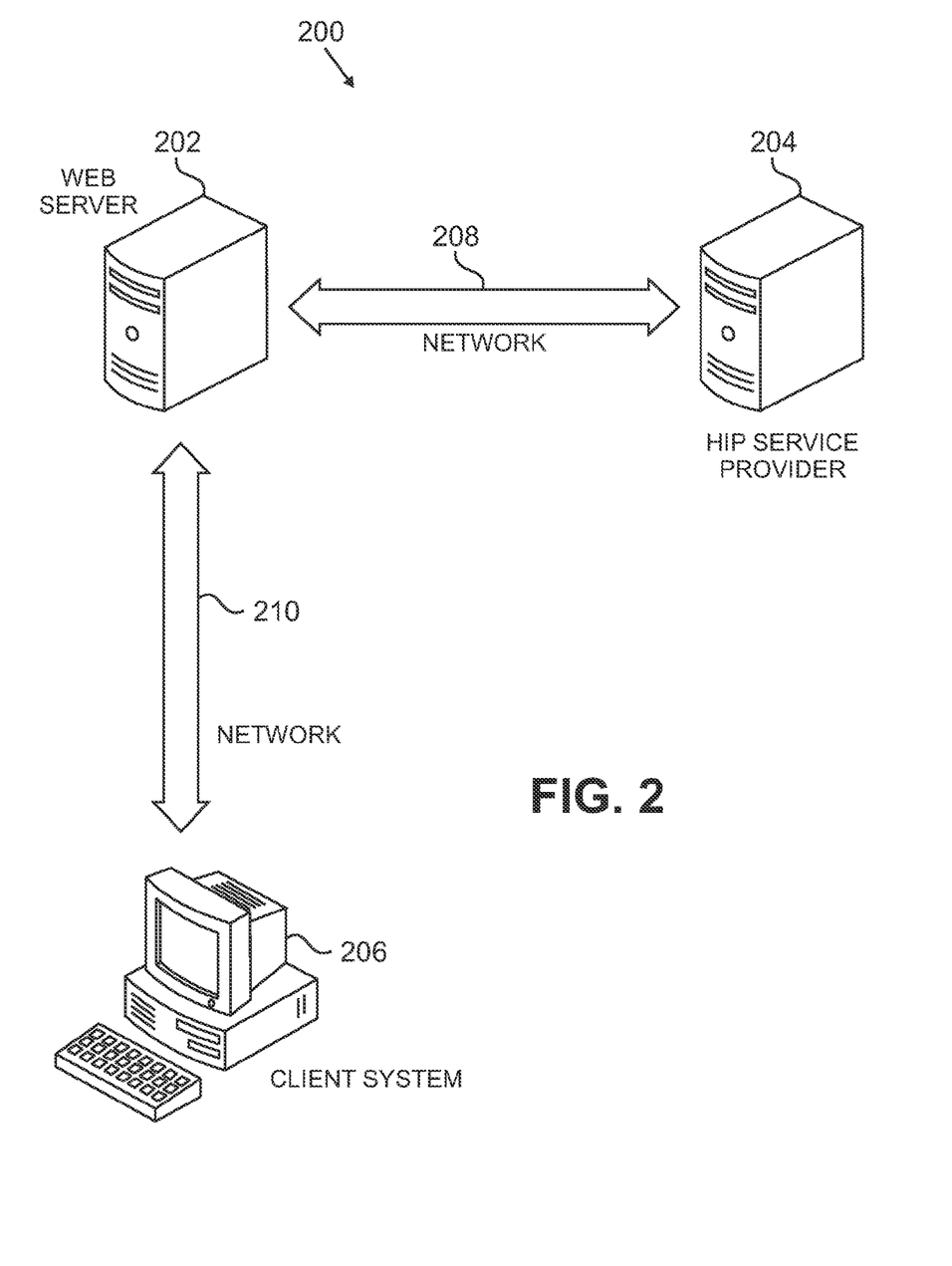
FIG. 2 is a pictorial diagram that illustrates an environment in which an exemplary human interactive proof service may be implemented.

FIG. 2 shows an illustrative network environment 200 in which a HIP service may be implemented. The illustrated environment includes server 202, HIP service provider 204, and client system 206. Communications between server 202 and HIP service provider 204 are transmitted over network 208. Communications between server 202 and client system 206 are transmitted over network 210. Although only one client system is illustrated, it is recognized, and expected, that environment 200 may support multiple client systems. Furthermore, although only one server is illustrated, it is also recognized, and expected, that environment 200 may support multiple servers.

Server 202 is configured to respond to requests received from client system 206. For example, if implemented as a web server, server 202 may generate and serve web pages in response to requests from client system 206. Server 202 may also be configured to evaluate a HIP challenge response received from client system 206, and to perform particular tasks based on whether or not the received HIP challenge response is correct. For example, if the received response is correct, access may be granted to another web page. On the other hand, if the received response is not correct, then an error message may be generated and transmitted to client system 206.

HIP service provider 204 is configured to generate HIP challenges based on requests received from server 202. HIP service provider 204 may also be configured to evaluate a response to a previously generated HIP challenge. It should be noted that in some cases web server 202 may incorporate all or part of the functionality performed by HIP service provider 204.

Networks 208 and 210 are representative of any type of data network over which requests and/or HIP challenges may be transmitted. Furthermore, networks 208 and 210 may be the same network or may be different networks. For example, network 208 may be an Ethernet network while network 210 may represent the Internet.

Figure 3:
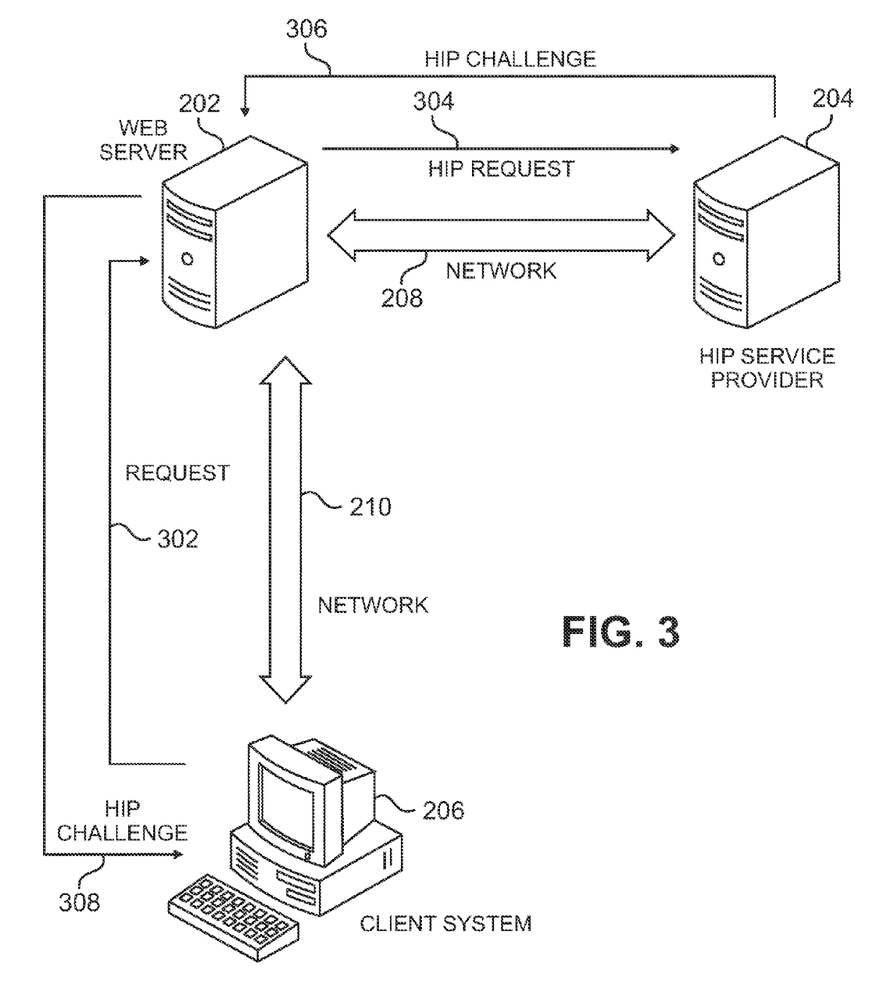
FIG. 3 is a pictorial diagram that illustrates an exemplary series of communications that may occur in obtaining a human interactive proof challenge from a human interactive proof service provider.

FIG. 3 illustrates an exemplary exchange of communication between client system 206, server 202, and HIP service provider 204, as illustrated in FIG. 2.

In the illustrated exemplary implementation, client system 206 submits a Request 302 (indicated by the arrow), to server 202. Request 302 may be any type of request, for example, a request for a web page, a request to access a database, a request to execute a software application, and so on.

In response to request 302, server 202 transmits a HIP request 304 to HIP service provider 204. HIP service provider 204 generates a HIP challenge based on the received HIP request 304.

HIP service provider 204 then returns the generated HIP challenge to server 202, as illustrated by arrow 306. Server 202 then transmits the HIP challenge to client system 206, as indicated by arrow 308. For example, the HIP challenge may be transmitted to client system 206 in the form of a web page that includes the HIP challenge.

Figure 4:
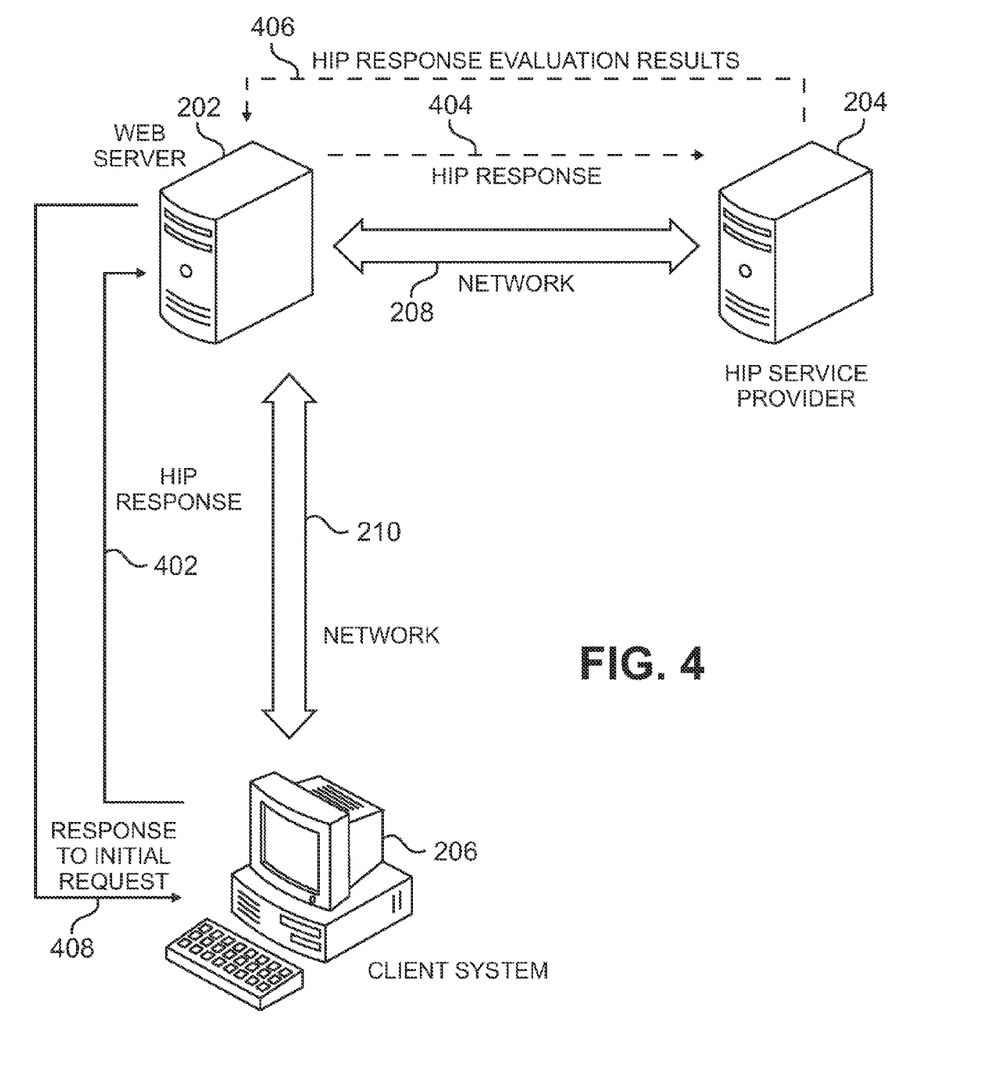
FIG. 4 is a pictorial diagram that illustrates an exemplary series of communications that may occur in evaluating a user response to a human interactive proof challenge.

FIG. 4 illustrates an example of an exchange of communication when a response to the HIP challenge is entered by a user. When the HIP challenge is received by client system 206 (as indicated by arrow 308 in FIG. 3), the HIP challenge is presented to the user. For example, if the HIP challenge is transmitted as part of a web page, then the web page is rendered on a display device associated with client system 206. A user may then enter a response to the HIP challenge. The user's response to the HIP challenge is then transmitted to server 202, as indicated by arrow 402.

Server 202 may then evaluate the received response to the HIP challenge. Alternatively, as indicated by dashed arrows 404 and 406, server 202 may transmit the received HIP response to HIP service provider 204 for evaluation. HIP service provider 204 may then evaluate the HIP response, and return HIP response evaluation results 406 that indicate whether or not the response to the HIP challenge is correct.

After the user's response to the HIP challenge has been evaluated, server 202 responds to the initial request (indicated by the arrow in FIG. 3). For example, if the initial request 302 was a request for a particular web page and the user's response to the HIP challenge was correct, then server 202 transmits the requested web page to client system 206. If the user's response to the HIP challenge is incorrect, server 202 may, for example, transmit an error message to client system 206.

As previously mentioned, HIPs are unlikely to achieve 100% accuracy. That is, HIPs are unlikely to be developed in which the machine failure rate is 100% while the human success rate is 100%. Moreover, as HIP challenges increase in difficulty in order to combat machines, both humans and machines may require an increasing number of attempts before successfully responding to the challenge.

As both machines and humans attempt to respond to HIP challenges, the manner in which they fail is often different. As a result, over repeated attempts the pattern of failures may differ, thereby providing distinctive signatures by which the machine can be distinguished from the human. In other words, instead of simply using the failure or success in passing a HIP challenge as the sole criterion to distinguish between a human and a machine, the pattern of responses to HIP challenges may be used as an additional criterion to make this distinction.

The different response patterns of humans and machines may be statistically derived. When an individual user (i.e., an individual human or machine) attempts to access an on-line resource multiple times, the response pattern of that user can be compared to the statistically derived response patterns for humans and machines which have previously been obtained.

Of course, in order to obtain the response pattern for an individual user, it is important to distinguish between different users to ensure that the response pattern that is obtained is indeed for a single user. Individual users can be tracked in a number of different ways. For instance, in some cases responses that are received from the same IP address may be assumed to be from the same user. Of course, for a number of reasons (e.g., use of proxies) a single IP address may not always correspond to a particular user. Accordingly, other techniques may be used to track or identify individual users. For example, in one alternative, responses received during a single session may be assumed to be from the same user. A session may be defined as a period of interactive activity between the user and a remote communication device (e.g., server) for the purpose of completing a task such as sending an email or other message (e.g., an instant message), completing a purchase, creating an account and the like. A user session can only be associated with a single IP address. However, an IP address can be associated with multiple sessions.

As yet another alternative, responses received from a known user who has previously established an account (and who may have already logged in using a password) can be assumed to be a single, individual user. Thus, in summary a user can be associated with an identifier such as an IP address, a user session, a user account and the like. Of course, any of these identifiers, as well as others, may also be used in combination with one another to increase the likelihood that a single individual is being tracked.

The response pattern or patterns that may be employed to distinguish between machines and humans may take a wide variety of forms and may often be determined empirically. Several examples of such response patterns will be presented below. Of course, these examples are presented by way of illustration only and should not be construed as a limitation on the techniques, methods and systems described herein.

One pattern that may be employed involves an examination of the ratio of the number of mismatched characters to the total number of characters in a given HIP challenge. This pattern may be referred to as a HIP score. HIP scores characteristic of humans and machines can determined from a statistical analysis of prior responses. In general a lower HIP score is more indicative of a user than a machine.

Since users (particularly machines) may make repeated requests to access a service even after successfully gaining access by correctly responding to a HIP challenge, another response pattern that may employed is the HIP failure pattern. The HIP failure pattern represents the fraction or percentage of previous HIP challenges to which the user did not successfully respond. For instance, a user who has failed HIP challenges 90% of the time over the last 20 attempts is more likely to be a machine than a user who has failed only 10% of the last 20 HIP challenges. Accordingly, even if the user who has a HIP failure pattern of 90% successfully responds to the current HIP challenge, that user nevertheless has a significant likelihood of being a machine. In this case, even though the user has passed the current HIP challenge, it may be desirable to request additional information from the user to better assess if the user is a machine or a human. This information may take the form of an additional HIP challenge or it may require a different type of response from the user altogether. For instance, the user may be sent an SMS with a passcode that must be correctly entered by the user.

Other response patterns that may be employed, individually or in combination with any other those presented above, include the number of HIP attempts per user identifier (e.g., IP address, user session and/or user account), and the success rate in responding to two or more successive HIP challenges. A larger number of attempts per user identifier suggests that the user may be a machine. On the other hand, a high success rate (e.g., greater than a prescribed percentage of the time) in responding to successive HIP challenges suggests that the user is a human.

In order to obtain response patterns from users that can be used to evaluate whether the user is a human or machine, user statistics can be collected during runtime at the IP address level, session level and/or user level. For example, the number of sessions per IP address over some period of time (e.g., day, week, month) and the number of user attempts and the fraction that are successful and unsuccessful may be collected. These same statistics may also be collected per user account. In addition, the user's success or failure in responding to the current HIP challenge may also recorded. If the HIP score is to be used in the evaluation process, the number of mismatched characters to the total number of characters in each HIP challenge presented to a user may be recorded. Of course, other user statistics may be collected as well, depending on the pattern or patterns that are to be used in the evaluation process.

Figure 5:
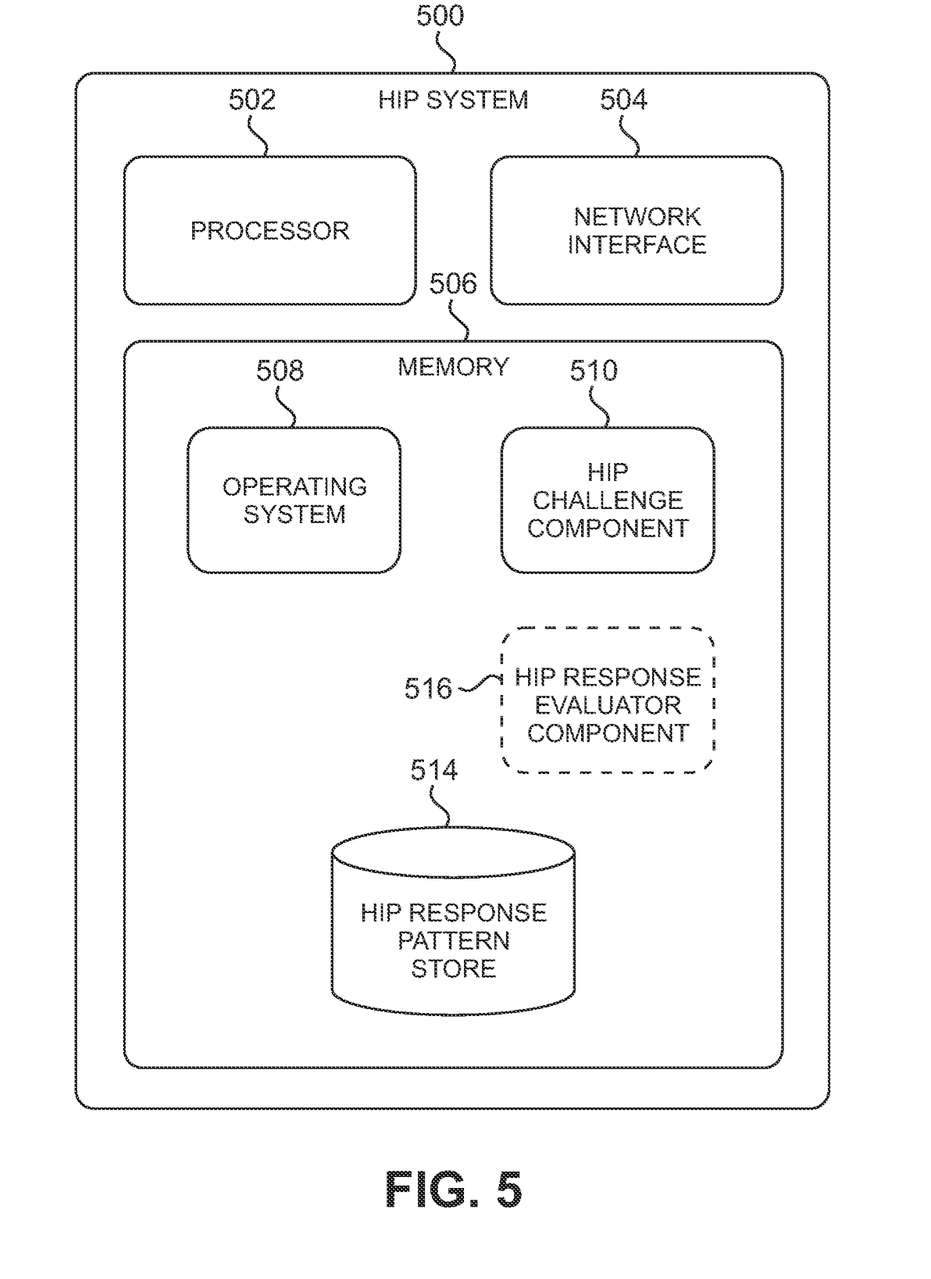
FIG. 5 is a logical block diagram of one example of a HIP system.

FIG. 5 illustrates select components of an exemplary HIP system 500. HIP system 500 includes processor 502, network interface 504, and memory 506. Network interface 504 enables communication between HIP system 500 and other computer systems, such as web servers and/or client systems, via a network such as the Internet. Of course, as previously mentioned, HIP system 500 may a subsystem of other network components such as the server that is delivering a service or other on-line resource to the user.

The memory 506 includes operating system 508, HIP challenge component 510, and HIP response evaluator component 516, which may be executed on processor 502. HIP challenge component 510 receives a request for a HIP challenge, and generates a HIP challenge based on the request. HIP challenges may be generated by any number of HIP challenge generation techniques. Furthermore, in some cases HIP challenge component 510 may be configured to support generation of customized HIP challenges. For example, a request for a HIP challenge may specify a difficulty level that is to be associated with the requested HIP challenge. That is, depending on the reason for requesting a HIP challenge, a requestor (e.g., a service provider) may desire a fairly simple HIP challenge, or a more difficult to solve challenge. HIP challenge component 510 may be configured to support generation of HIP challenges of various difficulty levels.

HIP service provider 500 also includes HIP response pattern store 514, which may be configured to store HIP responses provided by users. For example, when a response is received in response to a HIP challenge, the response may be stored in HIP response pattern store 514 along with the identifier associated with the user providing the response. The HIP response pattern store 514 also stores the known response patterns of humans and machines to which the user response pattern(s) is compared.

The HIP response evaluator component 516 is configured to receive a user-entered response to a particular HIP challenge and then evaluate the user-entered response to determine whether or not the response is correct. The HIP response evaluator component 516 is configured to determine if the user is a human or non-human based at least in part on a previous response pattern of the user. Illustrative examples of such response patterns which may be examined have been presented above.

Figure 6:
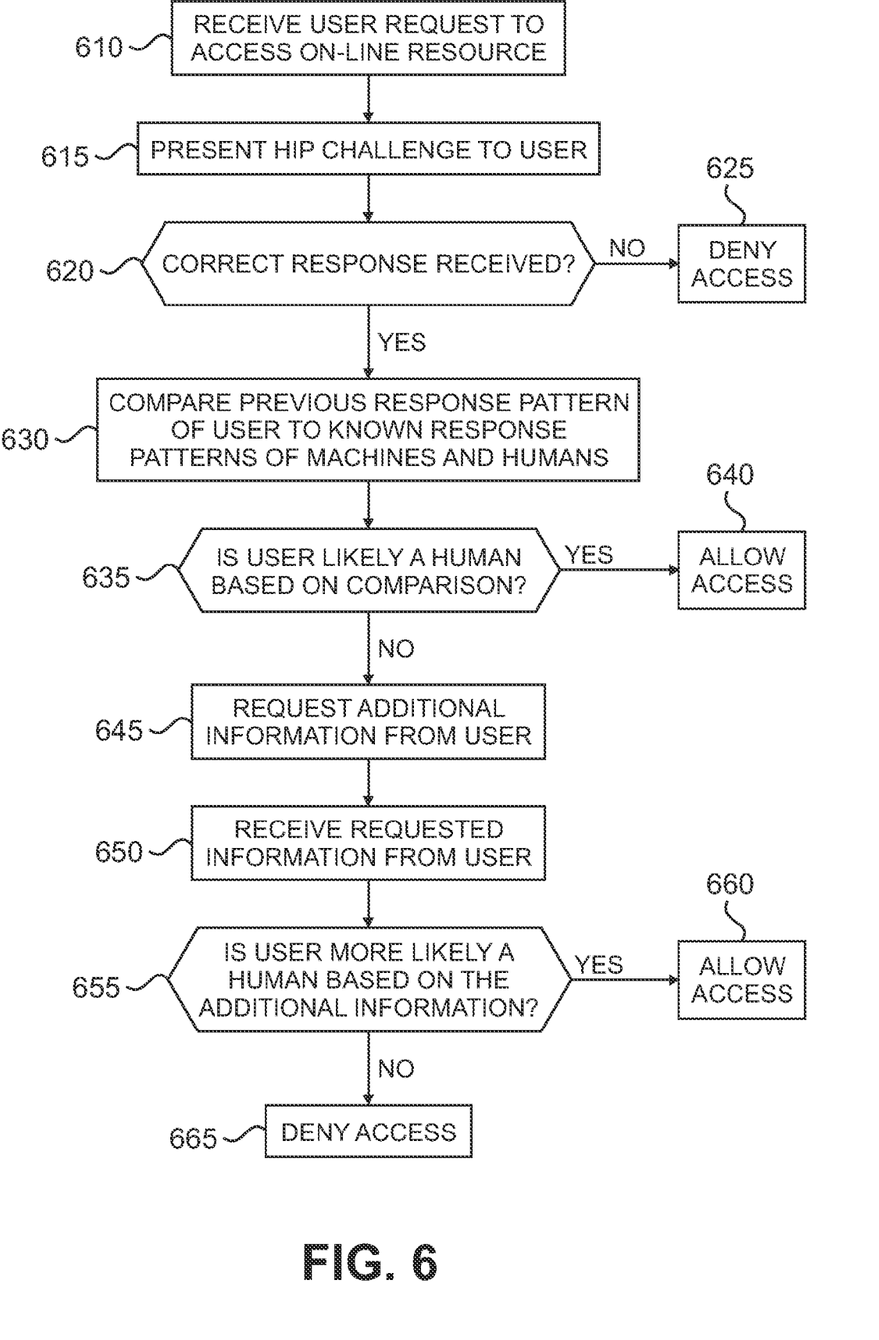
FIG. 6 is a flowchart illustrating one example of a method for protecting an online resource using a HIP challenge.

FIG. 6 is a flowchart illustrating one example of a method for protecting an online resource using a HIP challenge. The method begins in step 610 when a server associated with an on-line service provider receives a user request to access an on-line resource. In response, the server presents a HIP challenge to the user via the user's client device in step 615. It should be noted that for simplicity this example assumes that the HIP server is a subsystem of the service provider's server. Next, in step 620 the server receives the user's response to the challenge and determines if it is correct. If it is not correct, the user may be denied access to the on-line resource in step 625. If the response is correct, then the server, which may store the response for subsequent use, compares the previous response pattern of the user (over a single session or over a period of time such as the previous day or week) to known (e.g., statistically derived) response patterns of machines and humans. Based on this comparison the server determines if the user is likely to be a human in step 635. In some cases the determination may be made by assigning a percentage that specifies the probability that the user is human. If the probability exceeds a predefined threshold value, then the user is assumed to be a human. If the probability indicates that the user is indeed a human, then the user is allowed access to the on-line resource in step 640. On the other hand, if the comparison indicates that the user is probably a machine, then access may be denied. Alternatively, as shown in step 645, the server may request additional information from the user to further assess if the user is a machine or human. The additional information (e.g., a response to an additional HIP challenge) is received in step 650 and in step 655 the server reevaluates the likelihood that the user is a human. If the server determines that the user is likely a human to within some certainty, then in step 660 the user is allowed access to the on-line resource. Otherwise access is denied in step 665.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented system for implementing human interactive proof (HIP) challenges, the computer-implemented system comprising:
   a processor;
   a memory storing processor-executable instructions comprising a HIP challenge component and a HIP response evaluator component, wherein:
   the human interactive proof (HIP) challenge component displays a HIP challenge to a first user in response to receiving a user request to access a service;
   the HIP response evaluator component determines if the first user is human or non-human based on a response to the HIP challenge and a previous response pattern of a known user, if the first user is associated with the known user, the previous response pattern of the known user being obtained by tracking the known user over multiple sessions; and
   wherein if the response to the HIP challenge is correct, the HIP response evaluator component compares the previous response pattern of the first user to known response patterns of machines and humans to calculate a probability that the first user is human and determine if the first user is likely a human based on the probability, and if so, the HIP response evaluator component allows the first user access to the service.

2. The system of claim 1 in which the HIP challenge component is configured to associate the first users with the known users by individual IP address of the first user or the multiple sessions.

3. The system of claim 1 in which the HIP challenge component is configured to associate the first user with the known user based on an account to which the first user is logged in.

4. The system of claim 1 in which the previous response pattern includes a HIP failure pattern that represents a percentage of previous HIP challenges to which the user did not successfully respond.

5. The system of claim 1 in which HIP challenge includes a plurality of characters and the previous response pattern includes a HIP score that represents a ratio of mismatched characters to a total number of characters in the HIP challenge.

6. The system of claim 1 in which the HIP response evaluator component is configured to determine if the first user is a human or non-human by comparing a previous response pattern of the first user to statistically-derived response patterns of humans and machines;
    if the first user is not likely a human based on the comparison, HIP response evaluator component is configured to request additional information from the first user; and
    if the first user is more likely a human based on the additional information, HIP response evaluator component is configured to allow the first user access to a service requested by the first user.

7. The system of claim 6 in which the HIP response evaluator component is configured to determine if the user is a human or non-human by comparing a plurality of previous response patterns of the user to a plurality of different statistically-derived response patterns of humans and machines.

8. The system of claim 7 in which the plurality of previous response patterns and the plurality of statistically-derived response patterns includes a HIP failure pattern that represents a percentage of previous HIP challenges to which the user did not successfully respond and a HIP score that represents a ratio of mismatched characters in the HIP challenge to a total number of characters in the HIP challenge.

9. A method for distinguishing between a human and a non-human, the method comprising the steps of:
    receiving a request for service from a first user over a data network;
    presenting a HIP challenge to the first user over a data network;
    receiving a response to the HIP challenge from the first user over the data network;
    if the response from first user is correct, comparing a previous response pattern of the first user to known responses patterns of machines and humans, the previous response pattern of the first user obtained by tracking the first user over multiple sessions;
    determining if the first user is likely human by calculating a probability that the first user is human based on the comparison with the previous response pattern;
    if the first user is not determined to likely be human, requesting one or more additional HIP responses for one or more additional HIP challenges from the first user and recalculate the probability; and
    if the first user is more likely a human based on the recalculated probability, allowing the first user access to said service.

10. The method of claim 9 further comprising associating the first user with a known user from the IP address of the first user.

11. The method of claim 9 in which the previous response pattern includes a HIP failure pattern that represents a percentage of previous HIP challenges to which the user did not successfully respond.

12. The method of claim 9 in which the HIP challenge includes a plurality of characters and the previous response pattern includes a HIP score that represents a ratio of mismatched characters to a total number of characters in the HIP challenge.

13. A method for protecting an on-line resource using a HIP challenge, the method comprising the steps of:
    receiving a request to access the on-line resource from a remote user;
    presenting a HIP challenge to a user associated with the remote user;
    if a correct response to the HIP challenge is received from the remote user, comparing a previous response pattern of the remote user to known response patterns of machines and humans, the previous response pattern of the remote user obtained by tracking the remote user over multiple sessions,
    determining if the remote user is likely human by calculating a probability that the remote user is human based on the comparison with the previous response pattern;
    if the remote user is not likely human, requesting one or more additional responses for one or more additional HIP challenges from the remote user and recalculate the probability; and
    allowing the remote user access to the on-line resource if the recalculated probability indicates that the user is human.

14. The method of claim 13 further comprising denying the remote user access to the on-line resource if a recalculated probability indicates that the remote user is non-human is greater than a prescribed percentage.

15. The method of claim 13 further comprising presenting a second HIP challenge to the remote user if the comparison indicates that the remote user is likely a non-human is greater than a prescribed percentage.

16. The method of claim 13 further comprising requesting the one or more additional responses from the remote user if the comparison indicates that the remote user is likely a non-human is greater than a prescribed percentage.

17. The method of claim 13 in which the comparing includes comparing a plurality of previous response patterns of the remote user to a plurality of different known response patterns of humans and machines.

18. The method of claim 17 in which a first of the plurality of previous response patterns and the plurality of known response patterns includes a HIP failure pattern that represents a percentage of previous HIP challenges to which the remote user did not successfully respond.

19. The method of claim 17 in which a first of the plurality of previous response patterns and the plurality of known response patterns includes a HIP score that represents a ratio of mismatched characters in the HIP challenge to a total number of characters in the HIP challenge.

* * * * *